(12) United States Patent
Eberle (10) Patent No.: US 10,243,238 B2
(45) Date of Patent: Mar. 26, 2019

(54) ELECTROLYTE FOR LITHIUM CELL (71) Applicant: Robert Bosch GmbH, Stuttgart (DE)

(72) Inventor: Felix Eberle, Kyoto (JP)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 14/762,362

(22) PCT Filed: Jan. 15, 2014

(86) PCT No.: PCT/EP2014/050735
§ 371 (c)(1),
(2) Date: Nov. 3, 2015

(87) PCT Pub. No.: WO2014/114542
PCT Pub. Date: Jul. 31, 2014

(65) Prior Publication Data
US 2016/0056507 A1    Feb. 25, 2016

(30) Foreign Application Priority Data
Jan. 23, 2013   (DE) .................. 10 2013 201 030

(51) Int. Cl.
*H01M 10/056*    (2010.01)
*H01M 10/0569*   (2010.01)
(Continued)

(52) U.S. Cl.
CPC ....... *H01M 10/0569* (2013.01); *H01M 6/164* (2013.01); *H01M 6/168* (2013.01); *H01M 10/052* (2013.01); *H01M 10/0525* (2013.01); *H01M 10/0567* (2013.01); *H01M 10/0568* (2013.01); *H01M 2220/30* (2013.01); *H01M 2300/0034* (2013.01); *H01M 2300/0037* (2013.01); *Y02T 10/7011* (2013.01)

(58) Field of Classification Search
CPC ......... H01M 10/0569; H01M 10/0525; H01M 6/168; H01M 6/164; H01M 10/052; H01M 10/0568; H01M 10/0567; H01M 2220/30; H01M 2300/0037; H01M 2300/0034; Y02T 10/7011
See application file for complete search history.

(56) References Cited

U.S. PATENT DOCUMENTS

| | | | |
|---|---|---|---|
| 2001/0018146 A1* | 8/2001 | Shin ................... | H01M 10/052 429/61 |
| 2007/0254215 A1 | 11/2007 | Morikawa et al. | |
| 2012/0107701 A1* | 5/2012 | Iwaya .................. | H01G 9/035 429/341 |

FOREIGN PATENT DOCUMENTS

| | | |
|---|---|---|
| DE | 693 05 741 T2 | 4/1997 |
| DE | 692 26 667 T2 | 3/1999 |

(Continued)

OTHER PUBLICATIONS

International Search Report corresponding to PCT Application No. PCT/EP2014/050735, dated Mar. 24, 2014 (German and English language document) (8 pages).

*Primary Examiner* — Cynthia K Walls
(74) *Attorney, Agent, or Firm* — Walter Ottesen, P.A.

(57) ABSTRACT

An electrolyte, an electrolyte solvent, and an electrolyte additive, in particular for a lithium cell, include at least one ether. The at least one ether has at least one of the general chemical formula: R11R12R13C—(CR14R15)x1-[O—(CR31R32)a-(CR33R34)b]c-O—(CR24R25)x2-CR21R22R23 and of the general chemical formula: R41R42R43C—(CR44R45)y1-O—(CR54R55)y2-CR51R52R53.

14 Claims, 1 Drawing Sheet

(51) Int. Cl.
*H01M 10/052* (2010.01)
*H01M 10/0567* (2010.01)
*H01M 10/0568* (2010.01)
*H01M 6/16* (2006.01)
*H01M 10/0525* (2010.01)

(56) References Cited

FOREIGN PATENT DOCUMENTS

| | | | | |
|---|---|---|---|---|
| DE | 198 58 924 A1 | 6/2000 | | |
| DE | 102 09 429 A1 | 9/2002 | | |
| DE | 697 19 644 T2 | 10/2003 | | |
| DE | 102 47 675 A1 | 4/2004 | | |
| DE | 602 02 657 T2 | 1/2006 | | |
| DE | 603 04 534 T2 | 4/2007 | | |
| DE | 10 2010 043 111 A1 | 5/2012 | | |
| EP | 1315226 | * | 5/2003 | ............ H01M 10/40 |
| JP | 2000-149988 A | 5/2000 | | |
| JP | 2007-005242 A | 1/2007 | | |
| JP | 2008-027673 A | 2/2008 | | |

* cited by examiner

ELECTROLYTE FOR LITHIUM CELL

This application is a 35 U.S.C. § 371 National Stage Application of PCT/EP2014/050735, filed on Jan. 15, 2014, which claims the benefit of priority to Serial No. DE 10 2013 201 030.3, filed on Jan. 23, 2013 in Germany, the disclosures of which are incorporated herein by reference in their entirety.

The present disclosure relates to an electrolyte, to an electrolyte solvent, to an electrolyte additive, to ethers and to the use thereof.

BACKGROUND

Lithium ion cells have a positive electrode (cathode), a negative electrode (anode) and a porous separator disposed in between. The positive and negative electrodes each comprise a material into which lithium ions ($Li^+$) can be intercalated and out of which they can be deintercalated again, reversibly. The intercalation and deintercalation for lithium ions takes place in the presence of an electrolyte comprising a conductive lithium salt and at least one electrolyte solvent.

In most lithium ion cells both in the consumer sector, for example in cell phones, MP3 players or power tools, and in the automotive sector, for example in electrical vehicles and hybrid vehicles, the conductive lithium salt used is lithium hexafluorophosphate ($LiPF_6$). In order to dissolve the conductive lithium salt, ethylene carbonate (EC) is present in virtually all electrolytes currently used for lithium ion cells. The separator used is usually a polyethylene or polypropylene separator.

SUMMARY

The present disclosure relates to an electrolyte, to an electrolyte solvent and to an electrolyte additive, especially for a lithium cell, for example a lithium ion cell, comprising at least one ether, and to corresponding ethers and to the use thereof, more particularly, the at least one ether may be a symmetric or asymmetric ether, for example a (mono)ether or (oligo)ether.

A lithium cell may especially be understood to mean a cell having an electrochemical reaction based on an electrochemical reaction of lithium. A lithium cell may either be a lithium ion cell having a lithium intercalation anode, for example made from graphite, or a lithium metal cell having an anode made from metallic lithium or a lithium alloy.

It has been found that symmetric and asymmetric ethers, especially symmetric or asymmetric (mono)ethers or (oligo) ethers, firstly have a dielectric constant which may be higher than the dielectric constant of acyclic carbonates such as dimethyl carbonate (DMC), ethyl methyl carbonate (EMC) or diethyl carbonate (DEC). For example, symmetric and asymmetric ethers, especially symmetric or asymmetric (mono)ethers or (oligo)ethers, may have a dielectric constant of not less than 7, whereas the dielectric constant of acyclic carbonates, dimethyl carbonate (DMC), ethyl methyl carbonate (EMC) or diethyl carbonate (DEC) is typically only about 2 to 3. On the other hand, symmetric and asymmetric ethers, especially symmetric or asymmetric (mono)ethers or (oligo)ethers, may have a much lower viscosity than cyclic carbonates such as ethylene carbonate (EC) and propylene carbonate (PC). For example, symmetric and asymmetric ethers, especially symmetric or asymmetric (mono)ethers or (oligo)ethers, even at room temperature may have a viscosity of about 0.3 to 0.6 mPa*s, whereas the viscosity of ethylene carbonate (EC) at 40° C. is 1.9 mPa*s.

This advantageously enables in an electrolyte containing cyclic and/or acyclic carbonates, for example an ethylene carbonate-containing electrolyte, through the use of one or more symmetric and/or asymmetric ethers, a reduction in the proportion of cyclic and/or acyclic carbonates, especially the proportion of ethylene carbonate, and hence provision of an electrolyte having a reduced viscosity and having similarly good lithium ion solvation and coordination properties to an ether-free electrolyte having a higher proportion of cyclic carbonates, especially having a high ethylene carbonate content.

Through the reduction in the proportion of cyclic carbonates, especially in the ethylene carbonate content, it is additionally possible in an advantageous manner to reduce the interfacial tension of the electrolyte and hence to improve or accelerate the wetting propensity of the electrolyte with respect to polyolefin separators such as polyethylene (PE) and/or polypropylene (PP) separators. This is advantageous especially in the production of comparatively large lithium (ion) cells, since the electrolyte filling therein is a process step which generally takes a long time in the case of conventional electrolytes having a high ethylene carbonate content. The reason for this is that conventional electrolytes having a high ethylene carbonate content have a high surface tension of about 44 dynes/cm, and therefore these polyolefin separators, which typically have a surface tension of about 29-35 dynes/cm, are wetted only slowly. The use of the ether-containing electrolyte can advantageously bring about faster wetting of the separator with the electrolyte, and, as a result, faster incorporability of the electrolyte into the lithium ion cell being produced, and hence advantageous acceleration of the otherwise time-consuming process step of electrolyte filling. In addition, a reduction in the proportion of propylene carbonate or a propylene carbonate-free configuration of the electrolyte in the case of a graphite-containing anode can reduce or prevent exfoliation of the graphite by polycarbonate.

A reduction in the proportion of acyclic carbonates has the advantage that acyclic carbonates having a generally low flash point can be replaced by ethers having a higher flash point and hence the safety of the electrolyte can be improved.

However, addition of ethers while maintaining a high proportion of cyclic and/or acyclic carbonates can also bring advantages, since the ether can increase the solubility of the conductive salt or lithium salt in the electrolyte, and the electrolyte conductivity can advantageously be improved by a higher amount of conductive salt or lithium salt dissolved in the electrolyte.

In addition to use of ethers as cosolvent or solvent, surprisingly, even the addition of very small amounts of ether, for example in the range from ≥0.5% by weight to ≤2% by weight, to the electrolyte, i.e. even the use of ethers in the region of a conventional additive concentration, has been found to be advantageous since this can lead to improved formation of what is called the SEI ("solid electrolyte interface").

In order to achieve one or more of the above-described advantages, the at least one ether, especially symmetric or asymmetric ether, can be used in the context of the disclosure both as cosolvent and as additive, or else optionally as main solvent. The electrolyte, the electrolyte solvent and/or the electrolyte additive may optionally be ether-based. In this context, "main solvent" and "ether-based" may especially be understood to mean that the proportion of ethers, based on the total amount of carbonates and ethers or based on the total amount of solvent, amounts to at least 50% by weight. Optionally, the electrolyte, the electrolyte solvent and/or the electrolyte additive may be carbonate-free.

The disclosure provides an electrolyte comprising at least one cyclic carbonate and/or at least one acyclic carbonate and at least one ether.

In the context of one embodiment, the electrolyte comprises, based on the total weight of the carbonates and ethers, for example based on the total weight of solvent, ≥0.1% by weight to ≤20% by weight of ethers.

For example, the at least one ether may be used as cosolvent(s), in which case the electrolyte, based on the total weight of the carbonates and ethers, for example based on the total weight of solvent, may comprise >2% by weight to ≤20% by weight, especially ≥5% by weight to ≤10% by weight, of ethers.

Alternatively or additionally, however, at least one ether may also be used as additive.

In the context of a further embodiment, therefore, the electrolyte, based on the total weight of the carbonates and ethers, for example based on the total weight of solvent, comprises ≥0.5% by weight to ≤2% by weight of ethers.

Based on the total weight of the carbonates and ethers, for example based on the total weight of solvent, the electrolyte may comprise, for example, ≥15% by weight to ≤40% by weight, especially ≥20% by weight to ≤35% by weight, for example ≥25% by weight to ≤30% by weight, of cyclic carbonates and/or ≥50% by weight to ≤80% by weight, especially ≥55% by weight to ≤75% by weight, for example ≥61% by weight to ≤70% by weight, of acyclic carbonates.

An electrolyte which—based on the total weight of the carbonates and ethers, for example based on the total weight of solvent—comprises ≥15% by weight to ≤40% by weight, especially ≥20% by weight to ≤35% by weight, for example ≥25% by weight to ≤30% by weight, of cyclic carbonates, ≥50% by weight to ≤80% by weight, especially ≥55% by weight to ≤75% by weight, for example ≥60% by weight to ≤70% by weight, of acyclic carbonates and ≥0.1% by weight to ≤20% by weight, especially ≥5% by weight to ≤10% by weight and/or ≥0.5% by weight to ≤2% by weight, of ethers has been found to be particularly advantageous in terms of the lithium ion solvation or coordination properties, viscosity and wetting. For example, it has been found to be advantageous when the electrolyte, based on the total weight of the carbonates and ethers, for example based on the total weight of solvent, comprises about 25% by weight of cyclic carbonates, for example ethylene carbonate (EC), about 70% by weight of acyclic carbonates and about 5% by weight of ethers, or about 25% by weight of cyclic carbonates, for example ethylene carbonate (EC), about 65% by weight of acyclic carbonates and about 10% by weight of ethers, or about 30% by weight of cyclic carbonates, for example ethylene carbonate (EC), about 60% by weight of acyclic carbonates and about 10% by weight of ethers.

In the context of a further embodiment, the electrolyte further comprises at least one conductive lithium salt. More particularly, the electrolyte may comprise lithium hexafluorophosphate ($LiPF_6$).

In the context of a further embodiment, the at least one ether is selected from the group of the (mono)ethers, especially symmetric and/or asymmetric (mono)ethers, the (oligo)ethers, especially symmetric and/or asymmetric (oligo) ethers, and mixtures thereof. An oligoether may especially be understood to mean any ether having at least two to twenty ether oxygen atoms. For example, an oligoether may have a repeat ether unit repeating, for example, 2 to 10 times.

In the context of a specific embodiment, the electrolyte comprises at least one (mono)ether, especially symmetric and/or asymmetric (mono)ether, and/or at least one (oligo) ether, especially symmetric and/or asymmetric (oligo)ether, comprising at least one carboxylic acid group and/or carboxylic ester group and/or hydroxyl group and/or thiol group and/or halogen atom, especially fluorine atom, and/or sterically demanding group. More particularly, the (mono) ether or (oligo)ether may have at least two groups of this kind, in which case the groups may either be different from one another or the same.

A sterically demanding group may especially be understood to mean a group having a tertiary, quaternary, alkenylic (C—C double bond) or aromatic carbon atom, for example a branched or cyclic alkyl group or alkenyl group or an aryl group or a heteroaryl group.

More particularly, the (mono)ether or (oligo)ether may have at least two identical groups from those mentioned above. For example, the (mono)ether or (oligo)ether may have at least two carboxylic acid groups and/or at least two carboxylic ester groups and/or at least two hydroxyl groups and/or at least two thiol groups and/or at least two halogen atoms, especially fluorine atoms, and/or at least two sterically demanding groups.

Polar groups such as carboxylic acid groups, carboxylic ester groups, hydroxyl groups, thiol groups and halogen atoms, for example —$CO_2M$, —F, —Cl, —OH, —SH, can advantageously increase the polarity of the ether and hence improve the lithium solvation or coordination propensity thereof. For instance, it is advantageously possible to reduce the proportion of cyclic carbonates or increase the electrolyte conductivity.

Sterically demanding groups, for example tert-butyl, can advantageously reduce the viscosity of the ether. For instance, the wetting can advantageously be improved and/ or the electrolyte filling operation accelerated.

In the context of a specific embodiment, the electrolyte comprises at least one (oligo)ether of the general chemical formula (1):

and/or at least one (mono)ether of the general chemical formula (2):

More particularly, the at least one ether may be an (oligo)ether of the general chemical formula (1) and/or a (mono)ether of the general chemical formula (2).

In the general chemical formula (1):

1≤c≤10, for example 1≤c≤5, especially 1≤c≤2 or ≤3, 1≤a≤5, for example 1≤a≤2 and 0≤b≤5, for example 1≤b≤5, especially 1≤b≤2, where $x_1$ and $x_2$ are each independently a number ≤0 and ≤5, for example ≤0 and ≤1 and ≤3 or ≤2.

$R_{11}$ here is a carboxylic acid group (—$CO_2H$) or a carboxylic ester group, for example —$CO_2CH_3$ or —$CO_2C_2H_5$, or a hydroxyl group (—OH) or a thiol group (—SH) or a halogen atom, such as —F, —Cl, —Br, —I, for example —F or —Cl, or a branched or cyclic alkyl group, for example —$CH(CH_3)_2$, —$CH(CH_3)(C_2H_5)$, —$CH_2$—CH $(CH_3)_2$, —$C(CH_3)_3$, —$C_6H_{11}$, —$CF(CF_3)_2$, —$CF(CF_3)$ $(C_2F_5)$, —$CF_2$—$CF(CF_3)_2$, —$C(CF_3)_3$ or —$C_6F_{11}$, or an alkenyl group, especially a substituted or cyclic alkenyl group, for example a trans-substituted or cis-substituted or fully substituted C—C double bond unit, or an alkoxy group, especially a branched or cyclic alkoxy group, for example —O—$CH_3$, —O—$C_2H_5$, —O-n-$C_3H_7$, —O-n-$C_4H_9$, —O—$CH(CH_3)_2$, —O—$CH(CH_3)(C_2H_5)$, —O—$CH_2$—$CH(CH_3)_2$, —O—$C(CH_3)_3$, —O—$C_6H_{11}$, —O—$CF_3$, —O—$C_2F_5$, —O-n-$C_3F_7$, —O-n-$C_4F_9$, —O—$CF(CF_3)_2$, —O—$CF(CF_3)(C_2F_5)$, —O—$CF_2$—$CF(CF_3)_2$, —O—$C(CF_3)_3$ or —O—$C_6F_{11}$, or an aryl group, for example —$C_6H_5$ or —$C_6F_5$, or a heteroaryl group, or an aryloxy group, for example —O—$C_6H_5$ or —O—$C_6F_5$, or a heteroaryloxy group, where $R_{12}$ and $R_{13}$ are each independently hydrogen or a carboxylic acid group or a carboxylic ester group or a halogen atom or an alkyl group or an alkenyl group or an alkoxy group or an aryl group or a heteroaryl group or an aryloxy group or a heteroaryloxy group, for example —H, —$CO_2H$, —$CO_2CH_3$, —$CO_2C_2H_5$, —F, —Cl, —Br, —I, —$CH_3$, —$C_2H_5$, -n-$C_3H_7$, -n-$C_4H_9$, —$CH(CH_3)_2$, —$CH(CH_3)(C_2H_5)$, —$CH_2$—$CH(CH_3)_2$, —$C(CH_3)_3$, —$C_6H_{11}$, —$CF_3$, -n-$C_3F_7$, -n-$C_4F_9$, $(CF_3)_2$, —$CF(CF_3)(C_3F_5)$, —$CF_2$—$CF(CF_3)_2$, —$C(CF_3)_3$, —$C_6F_{11}$, —O—$CH_3$, —O—$C_2H_5$, —O-n-$C_3H_7$, —O-n-$C_4H_9$, —O—$CH(CH_3)_2$, —O—$CH(CH_3)(C_2H_5)$, —O—$CH_2$—$CH(CH_3)_2$, —O—$C(CH_3)_3$, —O—$C_6H_{11}$, —O—$CF_3$, —O—$C_2F_5$, —O-n-$C_3F_7$, —O-n-$C_4F_9$, —O—$CF(CF_3)_2$, —O—$CF(CF_3)(C_2F_5)$, —O—$CF_2$—$CF(CF_3)_2$, —O—$C(CF_3)_3$, —O—$C_6F_{11}$, —$C_6H_5$, —$C_6F_5$, —O—$C_6H_5$ or —O—$C_6F_5$, or —$CR_{11}R_{12}R_{13}$ is a branched alkyl group, for example —$CH(CH_3)_2$, —$CH(CH_3)(C_2H_5)$, —$CH_2$—$CH(CH_3)_2$, —$C(CH_3)_3$, —$CF(CF_3)_2$, —$CF(CF_3)(C_2F_5)$, —$CF_2$—$CF(CF_3)_2$ or —$C(CF_3)_3$, or a cyclic alkyl group, for example —$C_6H_{11}$ or —$C_6F_{11}$, or an alkenyl group, especially a substituted or cyclic alkenyl group, for example a trans-substituted or cis-substituted or fully substituted C—C double bond unit, or an aryl group, for example —$C_6H_5$ or —$C_6F_5$, or a heteroaryl group.

$R_{21}$, $R_{22}$, $R_{23}$ here are each independently hydrogen or a carboxylic acid group or a carboxylic ester group or a halogen atom or an alkyl group or an alkenyl group or an alkoxy group or an aryl group or a heteroaryl group or an aryloxy group or a heteroaryloxy group, for example —H, —$CO_2H$, —$CO_2CH_3$, —$CO_2C_2H_5$, —F, —Cl, —Br, —I, —$CH_3$, —$C_2H_5$, -n-$C_3H_7$, -n-$C_4H_9$, —$CH(CH_3)_2$, —$CH(CH_3)(C_2H_5)$, —$CH_2$—$CH(CH_3)_2$, —$C(CH_3)_3$, —$C_6H_{11}$, —$CF_3$, —$C_2F_5$, -n-$C_3F_7$, -n-$C_4F_9$, —$CF(CF_3)_2$, —$CF(CF_3)(C_2F_5)$, —$CF_2$—$CF(CF_3)_2$, —$C(CF_3)_3$, —$C_6F_{11}$, —O—$CH_3$, —O—$C_2H_5$, —O-n-$C_3H_7$, —O-n-$C_4H_9$, —O—$CH(CH_3)_2$, —O—$CH(CH_3)(C_2H_5)$, —O—$CH_2$—$CH(CH_3)_2$, —O—$C(CH_3)_3$, —O—$C_6H_{11}$, —O—$CF_3$, —O—$C_2F_5$, —O-n-$C_3F_7$, —O-n-$C_4F_9$, —O—$CF(CF_3)_2$, —O—$CF(CF_3)(C_2F_5)$, —O—$CF_2$—$CF(CF_3)_2$, —O—$C(CF_3)_3$, —O—$C_6F_{11}$, —$C_6H_5$, —$C_6F_5$, —O—$C_6H_5$ or —O—$C_6F_5$, or —$CR_{21}R_{22}R_{23}$ is a branched alkyl group, for example —$CH(CH_3)_2$, —$CH(CH_3)(C_2H_5)$, —$CH_2$—$CH(CH_3)_2$, —$C(CH_3)_3$, —$CF(CF_3)_2$, —$CF(CF_3)(C_2F_5)$, —$CF_2$—$CF(CF_3)_2$ or —$C(CF_3)_3$, or a cyclic alkyl group, for example —$C_6H_{11}$ or —$C_6F_{11}$, or an alkenyl group, especially a substituted or cyclic alkenyl group, for example a trans-substituted or cis-substituted or fully substituted C—C double bond unit, or an aryl group, for example —$C_6H_5$ or —$C_6F_5$, or a heteroaryl group.

$R_{14}$, $R_{15}$, $R_{31}$, $R_{32}$, $R_{33}$, $R_{34}$, $R_{24}$, $R_{25}$ here are each independently hydrogen or a carboxylic acid group or a carboxylic ester group or a halogen atom or an alkyl group or an alkenyl group or an alkoxy group or an aryl group or a heteroaryl group or an aryloxy group or a heteroaryloxy group, for example —H, —$CO_2H$, —$CO_2CH_3$, —$CO_2C_2H_5$, —F, —Cl, —Br, —I, —$CH_3$, —$C_2H_5$, -n-$C_3H_7$, -n-$C_4H_9$, —$CH(CH_3)_2$, —$CH(CH_3)(C_2H_5)$, —$CH_2$—$CH(CH_3)_2$, —$C(CH_3)_3$, —$C_6H_{11}$, —$CF_3$, —$C_2F_5$, -n-$C_3F_7$, -n-$C_4F_9$, —$CF(CF_3)_2$, —$CF(CF_3)(C_2F_5)$, —$CF_2$—$CF(CF_3)_2$, —$C(CF_3)_3$, —$C_6F_{11}$, —O—$CH_3$, —O—$C_2H_5$, —O-n-$C_3H_7$, —O-n-$C_4H_9$, —O—$CH(CH_3)_2$, —O—$CH(CH_3)(C_2H_5)$, —O—$CH_2$—$CH(CH_3)_2$, —O—$C(CH_3)_3$, —O—$C_6F_{11}$, —O—$CF_3$, —O—$C_2F_5$, —O-n-$C_3F_7$, —O-n-$C_4F_9$, —O—$CF(CF_3)_2$, —O—$CF(CF_3)(C_2F_5)$, —O—$CF_2$—$CF(CF_3)_2$, —O—$C(CF_3)_3$, —O—$C_6F_{11}$, —$C_6H_5$, —$C_6F_5$, —O—$C_6H_5$ or —O—$C_6F_5$.

The viscosity of ethers of this kind is dependent on the structure thereof, but may advantageously especially be below 1.9 mPa*s, for example within a range from about ≥0.3 mPa*s to ≤0.6 mPa*s.

More particularly, $R_{11}$ may be a carboxylic acid group or a carboxylic ester group or a hydroxyl group or a thiol group or a halogen atom or a branched or cyclic alkyl group or an alkenyl group, especially a substituted or cyclic alkenyl group, or an aryl group, and $R_{12}$ and $R_{13}$ may each independently be hydrogen or a carboxylic acid group or a carboxylic ester group or a halogen atom or an alkyl group or an alkenyl group or an aryl group, or —$CR_{11}R_{12}R_{13}$ may be a branched alkyl group or a cyclic alkyl group or an alkenyl group, especially a substituted or cyclic alkenyl group, or an aryl group.

In the context of one embodiment, in the general formula (1), $R_{11}$ is —$CO_2H$, —$CO_2CH_3$, —$CO_2C_2H_5$, —OH, —SH, —F, —$CH(CH_3)_2$, —$CH(CH_3)(C_2H_5)$, —$CH_2$—$CH(CH_3)_2$, —$C(CH_3)_3$, —$C_6H_{11}$, —$CF(CF_3)_2$, —$CF(CF_3)(C_2F_5)$, —$CF_2$—$CF(CF_3)_2$, —$C(CF_3)_3$, —$C_6F_{11}$, —$C_6H_5$ or —$C_6F_5$, especially —$CO_2H$, —$CO_2CH_3$, —$CO_2C_2H_5$, OH or —SH, for example —$CO_2M$, —$CO_2CH_3$, —$CO_2C_2H_5$ or —$CR_{11}R_{12}R_{13}$ is —$CH(CH_3)_2$, —$CH(CH_3)(C_2H_5)$, —$CH_2$—$CH(CH_3)_2$, —$C(CH_3)_3$, —$CF(CF_3)_2$, —$CF(CF_3)(C_2F_5)$, —$CF_2$—$CF(CF_3)_2$, —$C(CF_3)_3$, —$C_6H_{11}$, —$C_6F_{11}$, —$C_6H_5$ or —$C_6F_5$, especially —$CH(CH_3)_2$, —$CH_2$—$CH(CH_3)_2$, —$CH(CH_3)(C_2H_5)$, —$C(CH_3)_3$ or —$C_6H_5$.

As already elucidated, polar groups such as —$CO_2H$, —$CO_2CH_3$, —$CO_2C_2H_5$, —OH, —SH, —F can improve the lithium solvation or coordination propensity, and sterically demanding groups such as —$CH(CH_3)_2$, —$CH(CH_3)(C_2H_5)$, —$CH_2$—$CH(CH_3)_2$, —$C(CH_3)_3$ and such as cyclic alkyl groups, for example —$C_6H_{11}$ or —$C_6H_5$, or branched or cyclic alkenyl groups, can reduce the viscosity. These properties can advantageously also be improved by groups which are sterically demanding and polar in equal measure, such as —$CF(CF_3)_2$, —$CF(CF_3)(C_2F_5)$, —$CF_2$—$CF(CF_3)_2$, —$C(CF_3)_3$, —$C_6F_{11}$ or —$C_6F_5$.

In the context of a further embodiment, in the general chemical formula (1), $R_{21}$ is a carboxylic acid group (—$CO_2H$) or a carboxylic ester group, for example —$CO_2CH_3$ or —$CO_2C_2H_5$, or a hydroxyl group (—OH) or a thiol group (—SH) or a halogen atom, such as —F, —Cl, —Br, —I, for example —F or —Cl, or a branched or cyclic alkyl group, for example —$CH(CH_3)_2$, —$CH(CH_3)(C_2H_5)$, —$CH_2$—$CH(CH_3)_2$, —$C(CH_3)_3$, —$C_6H_{11}$, —$CF(CF_3)_2$, —$CF(CF_3)(C_2F_5)$, —$CF_2$—$CF(CF_3)_2$, —$C(CF_3)_3$ or —$C_6F_{11}$, or an alkenyl group, especially a substituted or cyclic alkenyl group, for example a trans-substituted or cis-substituted or fully substituted C—C double bond unit, or an alkoxy group, especially a branched or cyclic alkoxy group, for example —O—$CH_3$, —O—$C_2H_5$, —O-n-$C_3H_7$, —O-n-$C_4H_9$, —O—$CH(CH_3)_2$, —O—$CH(CH_3)(C_2H_5)$, —O—CH$_2$—CH(CH$_3$)$_2$, —O—C(CH$_3$)$_3$, —O—C$_6$H$_{11}$, —O—CF$_3$, —O—C$_2$F$_5$, —O-n-C$_3$F$_7$, —O-n-C$_4$F$_9$, —O—CF(CF$_3$)$_2$, —O—CF(CF$_3$)(C$_2$F$_5$), —O—CF$_2$—CF(CF$_3$)$_2$, —O—C(CF$_3$)$_3$ or —O—C$_6$F$_{11}$, or an aryl group, for example —C$_6$H$_5$ or —C$_6$F$_5$, or a heteroaryl group, or an aryloxy group, for example —O—C$_6$H$_5$ or —O—C$_6$F$_5$, or a heteroaryloxy group, and R$_{22}$ and R$_{23}$ are each independently hydrogen or a carboxylic acid group or a carboxylic ester group or a halogen atom or an alkyl group or an alkenyl group or an alkoxy group or an aryl group or a heteroaryl group or an aryloxy group or a heteroaryloxy group, for example —H, —CO$_2$H, —CO$_2$CH$_3$, —CO$_2$C$_2$H$_5$, —F, —Cl, —Br, —I, —CH$_3$, —C$_2$H$_5$, -n-C$_3$H$_7$, -n-C$_4$H$_9$, —CH(CH$_3$)$_2$, —CH(CH$_3$)(C$_2$H$_5$), —CH$_2$—CH(CH$_3$)$_2$, —C(CH$_3$)$_3$, —C$_6$H$_{11}$, —CF$_3$, —C$_2$F$_3$, -n-C$_3$F$_7$, -n-C$_4$F$_9$, —CF(CF$_3$)$_2$, —CF(CF$_3$)(C$_2$F$_5$), —CF$_2$—CF(CF$_3$)$_2$, —C(CF$_3$)$_3$, —C$_6$F$_{11}$, —O—CH$_3$, —O—C$_2$H$_5$, —O-n-C$_3$H$_7$, —O-n-C$_4$H$_9$, —O—CH(CH$_3$)$_2$, —O—CH(CH$_3$)(C$_2$H$_5$), —O—CH$_2$—CH(CH$_3$)$_2$, —O—C(CH$_3$)$_3$, —O—C$_6$H$_{11}$, —O—CF$_3$, —O—C$_2$F$_5$, —O-n-C$_3$F$_7$, —O-n-C$_4$F$_9$, —O—CF(CF$_3$)$_2$, —O—CF(CF$_3$)(C$_2$F$_5$), —O—CF$_2$—CF(CF$_3$)$_2$, —O—C(CF$_3$)$_3$, —O—C$_6$F$_{11}$, —C$_6$H$_5$, —C$_6$F$_5$, —O—C$_6$H$_5$ or —O—C$_6$F$_5$, or —CR$_{21}$R$_{22}$R$_{23}$ is a branched alkyl group, for example —CH(CH$_3$)$_2$, —CH(CH$_3$)(C$_2$H$_5$), —CH$_2$—CH(CH$_3$)$_2$, —C(CH$_3$)$_3$, —CF(CF$_3$)$_2$, —CF(CF$_3$)(C$_2$F$_5$), —CF$_2$—CF(CF$_3$)$_2$ or —C(CF$_3$)$_3$, or a cyclic alkyl group, for example —C$_6$H$_{11}$ or —C$_6$F$_{11}$, or an alkenyl group, especially a substituted or cyclic alkenyl group, for example a trans-substituted or cis-substituted or fully substituted C—C double bond unit, or an aryl group, for example —C$_6$H$_5$ or —C$_6$F$_5$, or a heteroaryl group.

It is thus advantageously possible to further improve the lithium solvation or coordination propensity and/or further reduce the viscosity.

More particularly, R$_{21}$ may be a carboxylic acid group or a carboxylic ester group or a hydroxyl group or a thiol group or a halogen atom or a branched or cyclic alkyl group or an alkenyl group, especially a substituted or cyclic alkenyl group, or an aryl group, and R$_{22}$ and R$_{23}$ may each independently be hydrogen or a carboxylic acid group or a carboxylic ester group or a halogen atom or an alkyl group or an alkenyl group or an aryl group, or —CR$_{21}$R$_{22}$R$_{23}$ may be a branched alkyl group or a cyclic alkyl group or an alkenyl group, especially a substituted or cyclic alkenyl group, or an aryl group.

In principle, R$_{21}$ may be identical to or different than R$_{11}$, and —CR$_{21}$R$_{22}$R$_{23}$ may be identical to or different than —CR$_{11}$R$_{12}$R$_{13}$.

In the context of a further embodiment, in the general chemical formula (1), however, R$_{21}$ is identical to R$_{11}$ or —CR$_{21}$R$_{22}$R$_{23}$ is identical to —CR$_{11}$R$_{12}$R$_{13}$.

In the context of a further embodiment, in the general chemical formula (1), R$_{31}$ and/or R$_{33}$ and/or R$_{12}$ and/or R$_{14}$ and/or R$_{22}$ and/or R$_{24}$ is/are an alkyl group, by way of example —CH$_3$, —C$_2$H$_5$, -n-C$_3$H$_7$, -n-C$_4$H$_9$, —CH(CH$_3$)$_2$, —CH(CH$_3$)(C$_2$H$_5$), —CH$_2$—CH(CH$_3$)$_2$, —C(CH$_3$)$_3$, —C$_6$H$_{11}$, —CF$_3$, —C$_2$F$_5$, -n-C$_3$F$_7$, -n-C$_4$F$_9$, —CF(CF$_3$)$_2$, —CF(CF$_3$)(C$_2$F$_5$), —CF$_2$—CF(CF$_3$)$_2$, —C(CF$_3$)$_3$ or —C$_6$F$_{11}$, for example —CH$_3$ or —C$_2$H$_5$. In this way, it is advantageously possible to introduce sterically demanding groups into the structure of the (oligo)ether, in order to reduce the viscosity.

R$_{32}$ and/or R$_{34}$ and/or R$_{13}$ and/or R$_{15}$ and/or R$_{23}$ and/or R$_{25}$ here may especially be hydrogen or likewise an alkyl group, by way of example —H, —CH$_3$, —C$_2$H$_5$, -n-C$_3$H$_7$, -n-C$_4$H$_9$, —CH(CH$_3$)$_2$, —CH(CH$_3$)(C$_2$H$_5$), —CH$_2$—CH(CH$_3$)$_2$, —C(CH$_3$)$_3$, —C$_6$H$_{11}$, —CF$_3$, —C$_2$F$_5$, -n-C$_3$F$_7$, -n-C$_4$F$_9$, —CF(CF$_3$)$_2$, —CF(CF$_3$)(C$_2$F$_5$), —CF$_2$—CF(CF$_3$)$_2$, —C(CF$_3$)$_3$ or —C$_6$H$_{11}$, for example —H or —CH$_3$ or —C$_2$H$_5$. Alkyl groups can advantageously further increase the steric demands of the structure of the (oligo)ether and especially further reduce the viscosity.

In the context of one configuration, R$_{32}$ and/or R$_{34}$ and/or R$_{13}$ and/or R$_{15}$ and/or R$_{23}$ and/or R$_{25}$, however, are hydrogen (—H). Since one alkyl substituent per carbon atom, which may already be provided, for example, as R$_{31}$ and/or R$_{33}$ and/or R$_{12}$ and/or R$_{14}$ and/or R$_{22}$ and/or R$_{24}$, may be sufficient in some cases for attainment of a suitable viscosity, the second substituent can optionally be simply maintained and be hydrogen.

Examples of symmetric (oligo)ethers of the general formula (1) are:

By way of example of the numerous symmetric (oligo)-ethers of the general formula (1) which may be based on a combination of the structural elements shown in the preceding examples, especially having two different terminal substituents among those shown above, the following asymmetric (oligo)ether of the general formula (1) is shown:

In the general chemical formula (2):

$$R_{41}R_{42}R_{43}C-(CR_{44}R_{45})_{y1}-O-(CR_{54}R_{55})_{y2}-CR_{51}R_{52}R_{53}$$

$y_1$ and $y_2$ are each independently a number $\geq 0$ and $\leq 5$, for example $\geq 0$ or $\geq 1$ and $\leq 3$ and $\leq 2$.

$R_{41}$ here is a carboxylic acid group (—$CO_2M$) or a carboxylic ester group, for example —$CO_2CH_3$ or —$CO_2C_2H_5$, or a hydroxyl group (—OH) or a thiol group (—SH) or a halogen atom, such as —F, —Cl, —Br, —I, for example —F or —Cl, or a branched or cyclic alkyl group, for example —$CH(CH_3)_2$, —$CH(CH_3)(C_2H_5)$, —$CH_2$—CH($CH_3)_2$, —$C(CH_3)_3$, —$C_6H_{11}$, ($CF_3)_2$, —$CF(CF_3)(C_2F_5)$, —$CF_2$—$CF(CF_3)_2$, —$C(CF_3)_3$ or —$C_6F_{11}$, or an alkenyl group, especially a substituted or cyclic alkenyl group, for example a trans-substituted or cis-substituted or fully substituted C—C double bond unit, or an alkoxy group, especially a branched or cyclic alkoxy group, for example —O—$CH_3$, —O—$C_2H_5$, —O-n-$C_3H_7$, —O-n-$C_4H_9$, —O—$CH(CH_3)_2$, —O—$CH(CH_3)(C_2H_5)$, —O—$CH_2$—$CH(CH_3)_2$, —O—$C(CH_3)_3$, —O—$C_6H_{11}$, —O—$CF_3$, —O—$C_2F_5$, —O-n-$C_3F_7$, —O-n-$C_4F_9$, —O—$CF(CF_3)_2$, —O—$CF(CF_3)(C_2F_5)$—O—$CF_2$—$CF(CF_3)_2$, —O—C($CF_3)_3$ or —O—$C_6F_{11}$, or an aryl group, for example —$C_6H_5$ or —$C_6F_5$, or a heteroaryl group, or an aryloxy group, for example —O—$C_6H_5$ or —O—$C_6F_5$, or a heteroaryloxy group, where $R_{42}$ and $R_{43}$ are each independently hydrogen or a carboxylic acid group or a carboxylic ester group or a halogen atom or an alkyl group or an alkenyl group or an alkoxy group or an aryl group or a heteroaryl group or an aryloxy group or a heteroaryloxy group, for example —H, —$CO_2M$, —$CO_2CH_3$, —$CO_2C_2H_5$, —F, —Cl, —Br, —I, —$CH_3$, —$C_2H_5$, -n-$C_3H_7$, -n-$C_4H_9$, —CH($CH_3)_2$, —$CH(CH_3)(C_2H_5)$, —$CH_2$—$CH(CH_3)_2$, —$C(CH_3)_3$, —$C_6H_{11}$, —$CF_3$, —$C_2F_5$, -n-$C_3F_7$, -n-$C_4F_9$, —$CF(CF_3)_2$, —$CF(CF_3)(C_2F_5)$, —$CF_2$—$CF(CF_3)_2$, —$C(CF_3)_3$, —$C_6F_{11}$, —O—$CH_3$, —O—$C_2H_5$, —O-n-$C_3H_7$, —O-n-$C_4H_9$, —O—$CH(CH_3)_2$, —O—$CH(CH_3)(C_2H_3)$—O—$CH_2$—$CH(CH_3)_2$, —O—$C(CH_3)_3$, —O—$C_6H_{11}$, —O—$CF_3$, —O—$C_2F_5$, —O-n-$C_3F_7$, —O-n-$C_4F_9$, —O—$CF(CF_3)_2$, —O—$CF(CF_3)(C_2F_5)$, —O—$CF_2$—$CF(CF_3)_2$, —O—$C(CF_3)_3$, —O—$C_6F_{11}$, —$C_6H_5$, —$C_6F_5$, —O—$C_6H_5$ or —O—$C_6F_5$, or —$CR_{11}R_{42}R_{43}$ is a branched alkyl group, for example —CH($CH_3)_2$, —$CH(CH_3)(C_2H_5)$, —$CH_2$—$CH(CH_3)_2$, —$C(CH_3)_3$, —$CF(CF_3)_2$, —$CF(CF_3)(C_2F_5)$, —$CF_2$—CF($CF_3)_2$ or —$C(CF_3)_3$, or a cyclic alkyl group, for example —$C_6H_{11}$ or —$C_6F_{11}$, or an alkenyl group, especially a substituted or cyclic alkenyl group, for example a trans-substituted or cis-substituted or fully substituted C—C double bond unit, or an aryl group, for example —O—$C_6H_5$ or —O—$C_6F_5$, or a heteroaryl group.

$R_{51}$, $R_{52}$, $R_{53}$ here are each independently hydrogen or a carboxylic acid group or a carboxylic ester group or a halogen atom or an alkyl group or an alkenyl group or an alkoxy group or an aryl group or a heteroaryl group or an aryloxy group or a heteroaryloxy group, for example —H, —$CO_2H$, —$CO_2CH_3$, —$CO_2C_2H_5$, —F, —Cl, —Br, —I, —$CH_3$, —$C_2H_5$, -n-$C_3H_7$, -n-$C_4H_9$, —$CH(CH_3)_2$, —CH($CH_3)(C_2H_5)$. —$CH_2$—$CH(CH_3)_2$, —$C(CH_3)_3$, —$C_6H_{11}$, —$CF_3$, —$C_2F_5$, -n-$C_3F_7$, -n-$C_4F_9$, —$CF(CF_3)_2$, —$CF(CF_3)(C_2F_5)$, —$CF_2$—$CF(CF_3)_2$, —$C(CF_3)_3$, —$C_6F_{11}$, —O—$CH_3$, —O—$C_2H_5$, —O-n-$C_3H_7$, —O-n-$C_4H_9$, —O—$CH(CH_3)_2$, —O—$CH(CH_3)(C_2H_5)$, —O—$CH_2$—$CH(CH_3)_2$, —O—$C(CH_3)_3$, —O—$C_6H_{11}$, —O—$CF_3$, —O—$C_2F_5$, —O-n-$C_3F_7$, —O-n-$C_4F_9$, —O—$CF(CF_3)_2$, —O—$CF(CF_3)(C_2F_5)$, —O—$CF_2$—$CF(CF_3)_2$, —O—$C(CF_3)_3$, —O—$C_6F_{11}$, —$C_6H_5$, —$C_6F_5$, —O—$C_6H_5$ or —O—$C_6F_5$, or —$CR_{51}R_{52}R_{53}$ is a branched alkyl group, for example —CH($CH_3)_2$, —$CH(CH_3)(C_2H_5)$, —$CH_2$—$CH(CH_3)_2$, —$C(CH_3)_3$, —$CF(CF_3)_2$, —$CF(CF_3)(C_2F_5)$, —$CF_2$—CF($CF_3)_2$ or —$C(CF_3)_3$, or a cyclic alkyl group, for example —$C_6H_{11}$ or —$C_6F_{11}$, or an alkenyl group, especially a substituted or cyclic alkenyl group, for example a trans-substituted or cis-substituted or fully substituted C—C double bond unit, or an aryl group, for example —O—$C_6H_5$ or —O—$C_6F_5$, or a heteroaryl group.

$R_{44}$, $R_{45}$, $R_{54}$ and $R_{55}$ here are each independently hydrogen or a carboxylic acid group or a carboxylic ester group or a halogen atom or an alkyl group or an alkenyl group or an alkoxy group or an aryl group or a heteroaryl group or an aryloxy group or a heteroaryloxy group, for example —H, —$CO_2H$, —$CO_2CH_3$, —$CO_2C_2H_5$, —F, —Cl, —Br, —I, —$CH_3$, —$C_2H_5$, n-$C_3H_7$, -n-$C_4H_9$, —$CH(CH_3)_2$, —CH($CH_3)(C_2H_5)$, —$CH_2$—$CH(CH_3)_2$, —$C(CH_3)_3$, —$C_6H_{11}$, —$CF_3$, —$C_2F_5$, -n-$C_3F_7$, -n-$C_4F_9$, —$CF(CF_3)_2$, —$CF(CF_3)(C_2F_5)$, —$CF_2$—$CF(CF_3)_2$, —$C(CF_3)_3$, —$C_6F_{11}$, —O—$CH_3$, —O—$C_2H_5$, —O-n-$C_3H_7$, —O-n-$C_4H_9$, —O—$CH(CH_3)_2$, —O—$CH(CH_3)(C_2H_5)$, —O—$CH_2$—CH($CH_3)_2$, —O—$C(CH_3)_3$, —O—$C_6H_{11}$, —O—$CF_3$, —O—$C_2F_5$, —O-n-$C_3F_7$, —O-n-$C_4F_9$, —O—$CF(CF_3)_2$, —O—$CF(CF_3)(C_2F_5)$, —O—$CF_2$—$CF(CF_3)_2$, —O—C($CF_3)_3$, —O—$C_6F_{11}$, —$C_6H_5$, —$C_6F_5$, —O—$C_6H_5$ or —O—$C_6F_5$.

The viscosity of ethers of this kind is dependent on the structure thereof, but may advantageously especially be below 1.9 mPa*s, for example within a range from about $\geq 0.3$ mPa*s to $\leq 0.6$ mPa*s.

More particularly, $R_{41}$ may be a carboxylic acid group or a carboxylic ester group or a hydroxyl group or a thiol group or a halogen atom or a branched or cyclic alkyl group or an alkenyl group, especially a substituted or cyclic alkenyl group, or an aryl group, and $R_{42}$ and/or $R_{43}$ may each independently be hydrogen or a carboxylic acid group or a carboxylic ester group or a halogen atom or an alkyl group or an alkenyl group or an aryl group, or —$CR_{41}R_{42}R_{43}$ may be a branched alkyl group or a cyclic alkyl group or an alkenyl group, especially a substituted or cyclic alkenyl group, or an aryl group.

In the context of one embodiment, in the general chemical formula (2), $R_{41}$ is —$CO_2H$, —$CO_2CH_3$, —$CO_2C_2H_5$, —OH, —SH, —F, —$CH(CH_3)_2$, —$CH(CH_3)(C_2H_5)$, —$CH_2$—$CH(CH_3)_2$, —$C(CH_3)_3$, —$C_6H_{11}$, —$CF(CF_3)_2$, —$CF(CF_3)(C_2F_5)$, —$CF_2$—$CF(CF_3)_2$, —$C(CF_3)_3$, —$C_6F_{11}$, —$C_6H_5$ or —$C_6F_5$, especially —$CO_2H$, —$CO_2CH_3$, —$CO_2C_2H_5$, —OH, —SH, —F, —$C_6H_{11}$, —$C_6F_{11}$, —$C_6H_5$ or —$C_6F_5$, for example —$CO_2H$, —$CO_2CH_3$, —$CO_2C_2H_5$, OH or —SH, for example —$CO_2H$, —$CO_2CH_3$, —$CO_2C_2H_5$ or —SH, or —$CR_{41}R_{42}R_{43}$ is —$CH(CH_3)_2$, —$CH(CH_3)(C_2H_5)$, —$CH_2$—$CH(CH_3)_2$, —$C(CH_3)_3$, —CF($CF_3)_2$, —$CF(CF_3)(C_2F_5)$, —$CF_2$—$CF(CF_3)_2$, —$C(CF_3)_3$, —$C_6H_{11}$, —$C_6F_{11}$, —$C_6H_5$ or —$C_6F_5$, especially —CH($CH_3)_2$, —$CH_2$—$CH(CH_3)_2$, —$CH(CH_3)(C_2H_5)$, —$C(CH_3)_3$ or —$C_6H_5$, for example —$C_6H_{11}$, —$C_6F_{11}$, —$C_6H_5$ or —$C_6F_5$.

As already elucidated, polar groups such as —$CO_2H$, —$CO_2CH_3$, —$CO_2C_2H_5$, —OH, —SH, —F can improve the lithium solvation or coordination propensity, and sterically demanding groups such as —$CH(CH_3)_2$, —$CH(CH_3)(C_2H_5)$, —$CH_2$—$CH(CH_3)_2$, —$C(CH_3)_3$ and such as cyclic alkyl groups, for example —$C_6F_{11}$ or —$C_6H_5$, or branched or cyclic alkenyl groups, can reduce the viscosity. These properties can advantageously also be improved by groups which are sterically demanding and polar in equal measure, such as —$CF(CF_3)_2$, —$CF(CF_3)(C_2F_5)$, —$CF_2$—$CF(CF_3)_2$, —$C(CF_3)_3$, —$C_6F_{11}$ or —$C_6F_5$.

In the context of a further embodiment, in the general chemical formula (2), $R_{51}$ is a carboxylic acid group (—$CO_2H$) or a carboxylic ester group, for example —$CO_2CH_3$ or —$CO_2C_2H_5$, or a hydroxyl group (—OH) or a thiol group (—SH) or a halogen atom, such as —F, —Cl, —Br, —I, for example —F or —Cl, or a branched or cyclic alkyl group, for example —$CH(CH_3)_2$, —$CH(CH_3)(C_2H_5)$, —$CH_2$—$CH(CH_3)_2$, —$C(CH_3)_3$, —$C_6H_{11}$, —$CF(CF_3)_2$, —$CF(CF_3)(C_2F_5)$, —$CF_2$—$CF(CF_3)_2$, —$C(CF_3)_3$ or —$C_6F_{11}$, or an alkenyl group, especially a substituted or cyclic alkenyl group, for example a trans-substituted or cis-substituted or fully substituted C—C double bond unit, or an alkoxy group, especially a branched or cyclic alkoxy group, for example —O—$CH_3$, —O—$C_2H_5$, —O-n-$C_3H_7$, —O-n-$C_4H_9$, —O—$CH(CH_3)_2$, —O—$CH(CH_3)(C_2H_5)$, —O—$CH_2$—$CH(CH_3)_2$, —O—$C(CH_3)_3$, —O—$C_6H_{11}$, —O—$CF_3$, —O—$C_2F_5$, —O-n-$C_3F_7$, —O-n-$C_4F_9$, —O—$CF(CF_3)_2$, —O—$CF(CF_3)(C_2F_5)$, —O—$CF_2$—$CF(CF_3)_2$, —O—$C(CF_3)_3$ or —O—$C_6F_{11}$, or an aryl group, for example —$C_6H_5$ or —$C_6F_5$, or a heteroaryl group, or an aryloxy group, for example —O—$C_6H_5$ or —O—$C_6F_5$, or a heteroaryloxy group, and $R_{52}$ and $R_{53}$ are each independently hydrogen or a carboxylic acid group or a carboxylic ester group or a halogen atom or an alkyl group or an alkenyl group or an alkoxy group or an aryl group or a heteroaryl group or an aryloxy group or a heteroaryloxy group, for example —H, —$CO_2H$, —$CO_2CH_3$, —$CO_2C_2H_5$, —F, —Cl, —Br, —I, —$CH_3$, —$C_2H_5$, -n-$C_3H_7$, -n-$C_4H_9$, —$CH(CH_3)_2$, —$CH(CH_3)(C_2H_5)$, —$CH_2$—$CH(CH_3)_2$ —$C(CH_3)_3$, —$C_6H_{11}$, —$CF_3$, —$C_2F_5$, -n-$C_3F_7$, -n-$C_4F_9$, —$CF(CF_3)_2$, —$CF(CF_3)(C_2F_5)$, —$CF_2$—$CF(CF_3)_2$, —$C(CF_3)_3$, —$C_6F_{11}$, —O—$CH_3$, —O—$C_2H_5$, —O-n-$C_3H_7$, —O-n-$C_4H_9$, —O—$CH(CH_3)_2$, —O—$CH(CH_3)(C_2H_5)$, —O—$CH_2$—$CH(CH_3)_2$, —O—$C(CH_3)_3$, —O—$C_6H_{11}$, —O—$CF_3$, —O—$C_2F_5$, —O-n-$C_3F_7$, —O-n-$C_4F_9$, —O—$CF(CF_3)_2$, —O—$CF(CF_3)(C_2F_5)$, —O—$CF_2$—$CF(CF_3)_2$, —O—$C(CF_3)_3$, —O—$C_6F_{11}$, —$C_6H_5$, —$C_6F_5$, —O—$C_6H_5$ or —O—$C_6F_5$, or —$CR_{51}R_{52}R_{53}$ is a branched alkyl group, for example —$CH(CH_3)_2$, —$CH(CH_3)(C_2H_5)$, —$CH_2$—$CH(CH_3)_2$, —$C(CH_3)_3$, —$CF(CF_3)_2$, —$CF(CF_3)(C_2F_5)$, —$CF_2$—$CF(CF_3)_2$ or —$C(CF_3)_3$, or a cyclic alkyl group, for example —$C_6H_{11}$ or —$C_6F_{11}$, or an alkenyl group, especially a substituted or cyclic alkenyl group, for example a trans-substituted or cis-substituted or fully substituted C—C double bond unit, or an aryl group, for example —$C_6H_5$ or —$C_6F_5$, or a heteroaryl group.

It is thus advantageously possible to further improve the lithium solvation or coordination propensity and/or further reduce the viscosity.

More particularly, $R_{51}$ may be a carboxylic acid group or a carboxylic ester group or a hydroxyl group or a thiol group or a halogen atom or a branched or cyclic alkyl group or an alkenyl group, especially a substituted or cyclic alkenyl group, or an aryl group, and $R_{52}$ and $R_{53}$ may each independently be hydrogen or a carboxylic acid group or a carboxylic ester group or a halogen atom or an alkyl group or an alkenyl group or an aryl group, or —$CR_{51}R_{52}R_{53}$ may be a branched alkyl group or a cyclic alkyl group or an alkenyl group, especially a substituted or cyclic alkenyl group, or an aryl group.

In principle, $R_{51}$ may be identical to or different than $R_{41}$, and —$CR_{51}R_{52}R_{53}$ may be identical to or different than —$CR_{41}R_{42}R_{43}$.

In the context of a further embodiment, in the general chemical formula (2), however, $R_{51}$ is identical to $R_{41}$ or —$CR_{51}R_{52}R_{53}$ is identical to —$CR_{41}R_{42}R_{43}$.

In the context of a further embodiment, in the general chemical formula (2), $R_{42}$ and/or $R_{44}$ and/or $R_{52}$ and/or $R_{54}$ is/are an alkyl group, by way of example —$CH_3$, —$C_2H_5$, -n-$C_3H_7$, -n-$C_4H_9$, —$CH(CH_3)_2$, —$CH(CH_3)(C_2H_5)$, —$CH_2$—$CH(CH_3)_2$, —$C(CH_3)_3$, —$C_6H_{11}$, —$CF_3$, —$C_2F_3$, -n-$C_3F_7$, -n-$C_4F_9$, —$CF(CF_3)_2$, —$CF(CF_3)(C_2F_5)$, —$CF_2$—$CF(CF_3)_2$, —$C(CF_3)_3$ or —$C_6F_{11}$, for example —$CH_3$ or —$C_2H_5$. In this way, it is advantageously possible to introduce sterically demanding groups into the structure of the (mono)ether, in order to reduce the viscosity.

$R_{43}$ and/or $R_{45}$ and/or $R_{53}$ and/or $R_{55}$ here may especially be hydrogen or likewise an alkyl group, by way of example —H, —$CH_3$, —$C_2H_3$, -n-$C_3H_7$, -n-$C_4H_9$, —$CH(CH_3)_2$, —$CH(CH_3)(C_2H_3)$, —$CH_2$—$CH(CH_3)_2$, —$C(CH_3)_3$, —$C_6H_{11}$, —$CF_3$, —$C_2F_5$, -n-$C_3F_7$, -n-$C_4F_9$, —$CF(CF_3)_2$, —$CF(CF_3)(C_2F_5)$, —$CF_2$—$CF(CF_3)_2$, —$C(CF_3)_3$ or —$C_6F_{11}$, for example —H or —$CH_3$ or —$C_2H_5$. Alkyl groups can advantageously further increase the steric demands of the structure of the (mono)ether and especially further reduce the viscosity.

In the context of one configuration, $R_{43}$ and/or $R_{45}$ and/or $R_{53}$ and/or $R_{55}$ are hydrogen (—H). Since one alkyl substituent per carbon atom, which may already be provided, for example, as $R_{42}$ and/or $R_{44}$ and/or $R_{52}$ and/or $R_{54}$, may be sufficient in some cases for attainment of a suitable viscosity, the second substituent can optionally be simply maintained and be hydrogen.

Examples of Symmetric (Mono)Ethers of the General Formula (2) are:

By way of example of the numerous asymmetric (mono)-ethers of the general formula (2) which may be based on a combination of the structural elements shown in the preceding examples, especially having two different terminal substituents among those shown above, the following asymmetric (mono)ethers of the general formula (2) are shown:

With regard to further technical features and advantages of the electrolyte of the disclosure, reference is hereby made explicitly to the elucidations in connection with the electrolyte solvent of the disclosure, the electrolyte additive of the disclosure, the ethers of the disclosure, the uses of the disclosure, the lithium cell or battery of the disclosure, and to the figures and the description of the figures.

The present disclosure further provides an electrolyte solvent or an electrolyte additive, especially for a lithium cell/battery, comprising at least one (oligo)ether of the general chemical formula (1): $R_{11}R_{12}R_{13}C\text{—}(CR_{14}R_{15})_{x1}\text{—}[O\text{—}(CR_{31}R_{32})_a\text{—}(CR_{33}R_{34})_b]_c\text{—}O\text{—}(CR_{24}R_{25})_{x2}\text{—}CR_{21}R_{22}R_{23}$ and/or at least one (mono)ether of the general chemical formula (2): $R_{41}R_{42}R_{43}C\text{—}(CR_{44}R_{45})_{y1}\text{—}O\text{—}(CR_{54}R_{55})_{y2}\text{—}CR_{51}R_{52}R_{53}$, or an (oligo)ether of the general chemical formula (1): $R_{11}R_{12}R_{13}C\text{—}(CR_{14}R_{15})_{x1}\text{—}[O\text{—}(CR_{31}R_{32})_a\text{—}(CR_{33}R_{34})_b]_c\text{—}O\text{—}(CR_{24}R_{25})_{x2}\text{—}CR_{21}R_{22}R_{23}$ and/or one (mono)ether of the general chemical formula (2): $R_{41}R_{42}R_{43}C\text{—}(CR_{44}R_{45})_{y1}\text{—}O\text{—}(CR_{54}R_{55})_{y2}\text{—}CR_{51}R_{52}R_{53}$, and also (oligo)ethers of the general chemical formula (1): $R_{11}R_{12}R_{13}C\text{—}(CR_{14}R_{15})_{x1}\text{—}[O\text{—}(CR_{31}R_{32})_a\text{—}(CR_{33}R_{34})_b]_c\text{—}O\text{—}(CR_{24}R_{25})_{x2}\text{—}CR_{21}R_{22}R_{23}$ and/or (mono)-ethers of the general chemical formula (2): $R_{41}R_{42}R_{43}C\text{—}(CR_{44}R_{45})_{y1}\text{—}O\text{—}(CR_{54}R_{55})_{y2}\text{—}CR_{51}R_{52}R_{53}$, and the use thereof as electrolyte solvent and/or electrolyte additive.

The substituents $R_{11}$, $R_{12}$, $R_{13}$, $R_{14}$, $R_{15}$, $R_{21}$, $R_{22}$, $R_{23}$, $R_{24}$, $R_{25}$, $R_{31}$, $R_{32}$, $R_{33}$, $R_{34}$ or $R_{41}$, $R_{42}$, $R_{43}$, $R_{44}$, $R_{45}$, $R_{51}$, $R_{52}$, $R_{53}$, $R_{54}$, $R_{55}$ may in principle have the same meaning as the meanings elucidated in connection with the electrolyte of the disclosure and the specific embodiments thereof for the substituents $R_{11}$, $R_{12}$, $R_{13}$, $R_{14}$, $R_{15}$, $R_{21}$, $R_{22}$, $R_{23}$, $R_{24}$, $R_{25}$, $R_{31}$, $R_{32}$, $R_{33}$, $R_{34}$ or $R_{41}$, $R_{42}$, $R_{43}$, $R_{44}$, $R_{45}$, $R_{51}$, $R_{52}$, $R_{53}$, $R_{54}$, $R_{55}$.

The electrolyte solvent or electrolyte additive may in principle comprise the at least one (oligo)ether of the general chemical formula (1) and/or the at least one (mono)ether of the general chemical formula (2) either as main solvent or main constituent or as cosolvent or secondary constituent, or else consist of the at least one (oligo)ether of the general chemical formula (1) or the at least one (mono)ether of the general chemical formula (2) or a mixture thereof.

The electrolyte solvent may comprise, for example, based on the total weight thereof, ≥0.1% by weight to ≤20% by weight, for example >2% by weight to ≤20% by weight, especially ≥5% by weight to ≤10% by weight, or ≥0.5% by weight to ≤2% by weight, of ethers of the general chemical formula (1) and (2) (in total).

As well as the at least one ether of the general chemical formula (1) and/or (2), the electrolyte solvent may comprise, for example, at least one further solvent, for example at least one cyclic carbonate and/or at least one acyclic carbonate. For example, the electrolyte solvent, based on the total weight thereof, may comprise ≥15% by weight to ≤40% by weight, especially ≥20% by weight to ≤35% by weight, for example ≥25% by weight to ≤30% by weight, of cyclic carbonates and/or ≥50% by weight to ≤80% by weight, especially ≥55% by weight to ≤75% by weight, for example ≥60% by weight to ≤70% by weight, of acyclic carbonates and/or ≥0.1% by weight to ≤20% by weight, especially ≥5% by weight to ≤10% by weight and/or ≥0.5% by weight to ≤2% by weight, of ethers. For example, the electrolyte solvent, based on the total weight thereof, may comprise about 25% by weight of cyclic carbonates, for example ethylene carbonate (EC), about 70% by weight of acyclic carbonates and about 5% by weight of ethers of the general chemical formula (1) and/or (2), or about 25% by weight of cyclic carbonates, for example ethylene carbonate (EC), about 65% by weight of acyclic carbonates and about 10% by weight of ethers of the general chemical formula (1) and/or (2), or about 30% by weight of cyclic carbonates, for example ethylene carbonate (EC), about 60% by weight of acyclic carbonates and about 10% by weight of ethers of the general chemical formula (1) and/or (2). For instance, the electrolyte solvent may advantageously be endowed with good lithium ion solvation or coordination and low viscosity.

The electrolyte additive used may be the at least one (oligo)ether of the general chemical formula (1) and/or the at least one (mono)ether of the general chemical formula (2), for example in such a way that it is added to an electrolyte solvent or electrolyte solvent mixture in an amount within a range from ≥0.5% by weight to ≤2% by weight, based on the total weight of solvent.

In the context of a specific embodiment, $R_{41}$ and/or $R_{51}$ or $R_{11}$ and/or $R_{21}$ is a carboxylic acid group ($-CO_2H$) or a carboxylic ester group, for example $-CO_2CH_3$ or $-CO_2C_2H_5$, or a hydroxyl group ($-OH$) or a thiol group ($-SH$) or a halogen atom, such as $-F$, $-Cl$, $-Br$, $-I$, for example $-F$ or $-Cl$, or a cyclic alkyl group, for example $-C_6H_{11}$ or $-C_6F_{11}$, or an alkenyl group, especially a substituted or cyclic alkenyl group, for example a trans-substituted or cis-substituted or fully substituted C—C double bond unit, or an alkoxy group, especially a branched or cyclic alkoxy group, for example $-O-CH_3$, $-O-C_2H_5$, $-O$-n-$C_3H_7$, $-O$-n-$C_4H_9$, $-O-CH(CH_3)_2$, $-O-CH(CH_3)(C_2H_5)$, $-O-CH_2-CH(CH_3)_2$, $-O-C(CH_3)_3$, $-O-C_6H_{11}$, $-O-CF_3$, $-O-C_2F_5$, $-O$-n-$C_3F_7$, $-O$-n-$C_4F_9$, $-O-CF(CF_3)_2$, $-O-CF(CF_3)(C_2F_3)$, $-O-CF_2-CF(CF_3)_2$, $-O-C(CF_3)_3$ or $-O-C_6F_{11}$, or an aryl group, for example $-C_6H_5$ or $-C_6F_5$, or a heteroaryl group, or an aryloxy group, for example $-O-C_6H_5$ or $-O-C_6F_5$ or a heteroaryloxy group, and $R_{42}$ and $R_{43}$ and/or $R_{52}$ and $R_{53}$ or $R_{12}$ and $R_{13}$ and/or $R_{22}$ and $R_{23}$ are each independently hydrogen or a carboxylic acid group or a carboxylic ester group or a halogen atom or an alkyl group or an alkenyl group or an alkoxy group or an aryl group or a heteroaryl group or an aryloxy group or a heteroaryloxy group, for example $-H$, $-CO_2H$, $-CO_2CH_3$, $-CO_2C_2H_5$, $-F$, $-Cl$, $-Br$, $-I$, $-CH_3$, $-C_2H_5$, -n-$C_3H_7$, -n-$C_4H_9$, $-CH(CH_3)_2$, $-CH(CH_3)(C_2H_5)$, $-CH_2-CH(CH_3)_2$, $-C(CH_3)_3$, $-C_6H_{11}$, $-CF_3$, $-C_2F_5$, -n-$C_3F_7$, -n-$C_4F_9$, $-CF(CF_3)_2$, $-CF(CF_3)(C_2F_5)$, $-CF_2-CF(CF_3)_2$, $-C(CF_3)_3$, $-C_6F_{11}$, $-O-CH_3$, $-O-C_2H_5$, $-O$-n-$C_3H_7$, $-O$-n-$C_4H_9$, $-O-CH(CH_3)_2$, $-O-CH(CH_3)(C_2H_5)$, $-O-CH_2-CH(CH_3)_2$, $-O-C(CH_3)_3$, $-O-C_6H_{11}$, $-O-CF_3$, $-O-C_2F_5$, $-O$-n-$C_3F_7$, $-O$-n-$C_4F_9$, $-O-CF(CF_3)_2$, $-O-CF(CF_3)(C_2F_5)$, $-O-CF_2-CF(CF_3)_2$, $-O-C(CF_3)_3$, $-O-C_6F_{11}$, $-C_6H_5$, $-C_6F_5$, $-O-C_6H_5$ or $-O-C_6F_5$, or $-CR_{41}R_{42}R_{43}$ and/or $-CR_{51}R_{52}R_{53}$ or $-CR_{11}R_{12}R_{13}$ and/or $-CR_{21}R_{22}R_{23}$ is a cyclic alkyl group, for example $-C_6H_{11}$ or $-C_6F_{11}$, or an alkenyl group, especially a substituted or cyclic alkenyl group, for example a trans-substituted or cis-substituted or fully substituted C—C double bond unit, or an aryl group, for example $-C_6H_5$ or $-C_6F_5$, or a heteroaryl group.

In the context of a further specific embodiment, $R_{11}$ or $R_{21}$ is $-CO_2H$, $-CO_2CH_3$, $-CO_2C_2H_5$, $-SH$ or $-OH$, or $-CR_{11}R_{12}R_{13}$ or $-CR_{21}R_{22}R_{23}$ is $-CH(CH_3)_2$, $-CH_2-CH(CH_3)_2$, $-CH(CH_3)(C_2H_5)$, $-C(CH_3)_3$, $-C_6H_{11}$, $-C_6H_{11}$, $-C_6H_5$ or $-C_6F_5$. More particularly, $R_{21}$ and $R_{11}$ may be the same or $-CR_{21}R_{22}R_{23}$ and $-CR_{11}R_{12}R_{13}$ may be the same.

In the context of a further specific embodiment, $R_{31}$ and/or $R_{33}$ and/or $R_{12}$ and/or $R_{14}$ and/or $R_{22}$ and/or $R_{24}$ are an alkyl group and where $R_{32}$ and/or $R_{34}$ and/or $R_{13}$ and/or $R_{15}$ and/or $R_{23}$ and/or $R_{25}$ are hydrogen or an alkyl group.

In the context of a further specific embodiment, $R_{41}$ or $R_{51}$ is $-CO_2H$, $-CO_2CH_3$, $-CO_2C_2H_5$, $-OH$, $-SH$, $-F$, $-C_6H_{11}$, $-C_6F_{11}$, $-C_6H_5$ or $-C_6F_5$, especially $-CO_2H$, $-CO_2CH_3$, $-CO_2C_2H_5$, $-OH$ or $-SH$, for example $-CO_2H$, $-CO_2CH_3$, $-CO_2C_2H_5$ or $-SH$, or $-CR_{41}R_{42}R_{43}$ or $-CR_{51}R_{52}R_{53}$ is $-C_6H_{11}$, $-C_6F_{11}$, $-C_6H_5$ or $-C_6F_5$. More particularly, $R_{41}$ or $R_{51}$ or $-CR_{41}R_{42}R_{43}$ and $-CR_{51}R_{52}R_{53}$ may be the same.

In the context of a further specific embodiment, $R_{42}$ and/or $R_{44}$ and/or $R_{52}$ and/or $R_{54}$ are an alkyl group and where $R_{43}$ and/or $R_{45}$ and/or $R_{53}$ and/or $R_{55}$ are hydrogen or an alkyl group.

With regard to further technical features and advantages of the electrolyte solvent of the disclosure, of the electrolyte additive of the disclosure, of the ethers of the disclosure and the uses thereof, reference is hereby made explicitly to the elucidations in connection with the electrolyte of the disclosure, the lithium cell or battery of the disclosure, and the figures and the description of the figures.

The disclosure further relates to a lithium cell or lithium battery, especially a lithium ion cell or lithium ion battery, for example an electric vehicle (EV), a hybrid or micro-hybrid or plug-in electric vehicle (HEV or μ-HEV or PHEV), a mobile, stationary and/or maritime application, for example for a tool and/or garden appliance (power tool) or a consumer device, for example a cell phone, laptop/notebook, MP3 player, which comprise an electrolyte of the disclosure and/or an electrolyte solvent of the disclosure and/or an electrolyte additive of the disclosure and/or an ether of the disclosure. The lithium cell/battery may especially have a negative electrode (anode) and a positive electrode (cathode). The negative electrode and the positive electrode may be separated spatially from one another by a separator, for example a porous separator, for example made from polyethylene and/or polypropylene. The negative electrode may comprise graphite, for example. The positive electrode may comprise, for example, a metal oxide and/or metal phosphate, for example lithium nickel cobalt manganese oxide (NCM), lithium nickel cobalt aluminum oxide (NCA), lithium cobalt oxide, a spinel such as lithium manganese oxide ($LiMn_2O_4$) and/or lithium iron phosphate ($LiFePO_4$).

With regard to further technical features and advantages of the lithium cell or lithium battery of the disclosure, reference is hereby made explicitly to the elucidations in connection with the electrolyte of the disclosure, the electrolyte solvent of the disclosure, the electrolyte additive of the disclosure, the ethers of the disclosure, the uses of the disclosure, and the figures and the description of the figures.

BRIEF DESCRIPTION OF THE DRAWINGS

Further advantages and advantageous configurations of the subject matter of the disclosure are illustrated by the drawings and elucidated in the description which follows. It should be noted here that the drawings are merely of descriptive character and are not intended to restrict the disclosure in any way at all. The drawings show.

DETAILED DESCRIPTION

Figure 1:
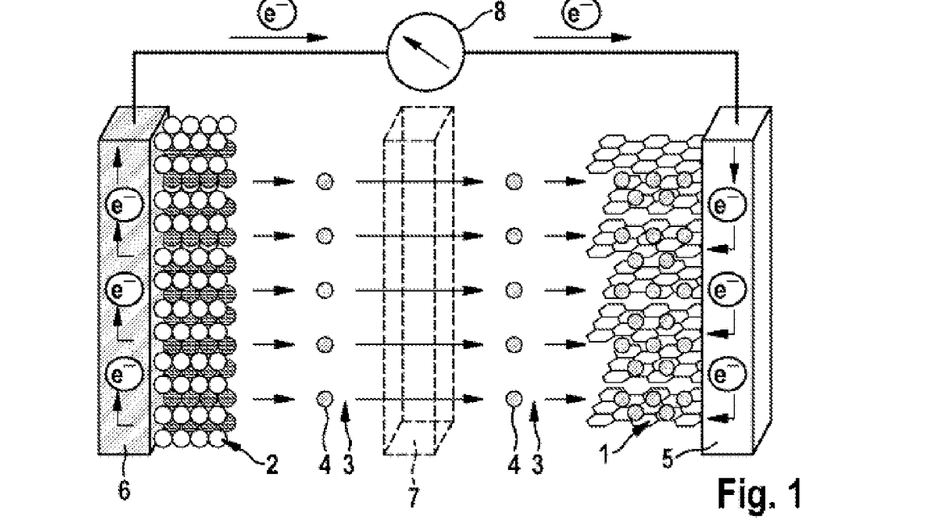
FIG. 1 a schematic view of a lithium ion cell during the charging operation.
Figure 2:
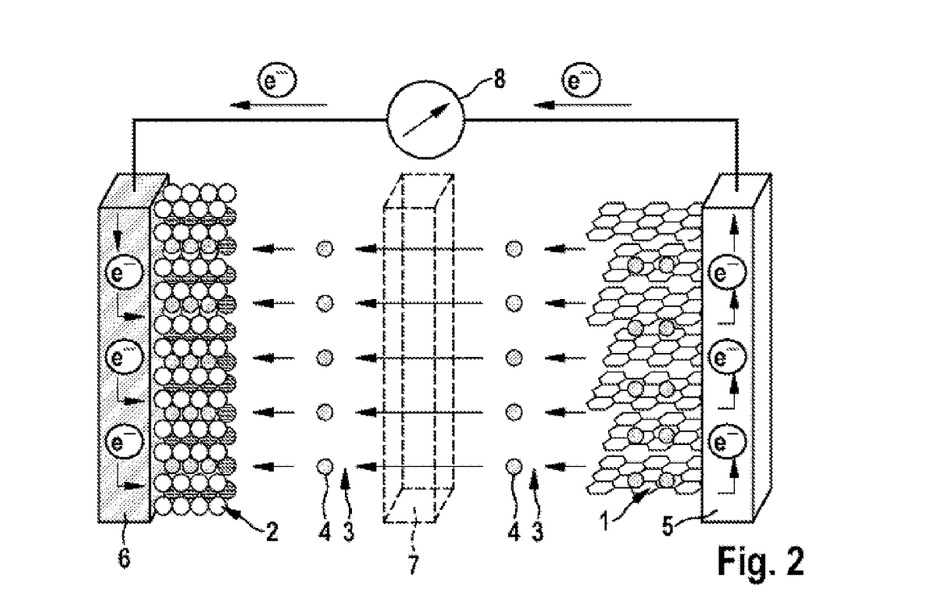
FIG. 2 a schematic view of the lithium ion cell shown in FIG. 1 during the discharging operation.

FIGS. 1 and 2 show that the lithium ion cell has an anode (negative electrode) 1 and a cathode (positive electrode) 2, separated spatially from one another by a porous separator 7, for example made from polyethylene and/or polypropylene. The anode 1 may comprise, for example, graphite ($C_6$) and the cathode 2 may comprise a metal oxide ($LiMO_2$, $LiM_yO_z$) and/or metal phosphate, for example lithium nickel cobalt manganese oxide (NCM), lithium nickel cobalt aluminum oxide (NCA), lithium cobalt oxide, a spinel such as lithium manganese oxide ($LiMn_2O_4$) and/or lithium iron phosphate ($LiFePO_4$).

FIGS. 1 and 2 show that the anode 1 is in contact with an anode output conductor 5, for example made from copper, and the cathode 2 with a cathode output conductor 6, for example made from aluminum. In the context of the diagram shown in FIGS. 1 and 2, the anode output conductor 5 and the cathode output conductor 6 are electrically connected to one another via an ampere meter 8.

FIGS. 1 and 2 further indicate that the cell includes an electrolyte 3 comprising an electrolyte solvent or electrolyte solvent mixture that coordinates and solvates lithium ions 4. In addition, the electrolyte 3 may comprise a lithium-containing conductive salt (conductive lithium salt), for example lithium hexafluorophosphate ($LiPF_6$). As electrolyte solvent, the electrolyte 3 may especially comprise at least one (oligo)ether of the general chemical formula (1) and/or a (mono)ether of the general chemical formula (2). Optionally, the electrolyte 3 may additionally comprise at least one cyclic carbonate, for example ethylene carbonate (EC), and/or at least one acyclic carbonate.

FIG. 1 illustrates that, during the charging operation, lithium ions 4 ($Li^+$) leaving the cathode 2 ($Li_{(1-x)}MO_2$, $Li_{(1-x)}M_yO_z$) are solvated by the electrolyte 3. The lithium ions 4 solvated in the electrolyte 3 then migrate through the porous separator 7 to the anode 1, where they intercalate into the graphite ($Li_xC_6$). At the same time, electrons $e^-$ move from the cathode output conductor 6 to the anode output conductor, i.e. electrical current flows—through the output conductors 5, 6 and the ampere meter 8—from the anode 1 to the cathode 2.

FIG. 2 illustrates that, during the discharging operation, this process runs in reverse, with movement of electrons $e^-$ from the anode output conductor 5 to the cathode output conductor 6, i.e. flow of electrical current—through the output conductors 5, 6 and the ampere meter 8—from the cathode 2 to the anode 1, and with deintercalation of the lithium ions 4 ($Li^+$) out of the graphite ($Li_xC_6$) and solvation by the electrolyte 3 and then migration, solvated in the electrolyte 3, through the porous separator 7 to the cathode 2 ($Li_{(1-x)}MO_2$, $Li_{(1-x)}M_yO_z$) and intercalation into the material thereof.

The charging and discharging operation can be expressed by the following equation:

$$C_6 + LiMO_2 \leftrightarrow Li_xC_6 + Li_{(1-x)}MO_2.$$

The invention claimed is:

1. An electrolyte, comprising:
   at least one cyclic carbonate and/or at least one acyclic carbonate, and
   at least one ether,
   wherein the at least one ether comprises at least one carboxylic acid group, carboxylic ester group, hydroxyl group, thiol group, halogen atom alkenylic group, an aromatic hydrocarbon, a cyclic alkyl group, an aryl group, or a heteroaryl group, and
   wherein the electrolyte, based on a total weight of the carbonates and ethers, comprises:
   ≥50% by weight to ≤80% by weight of acyclic carbonates;
   ≥15% by weight to ≤40% by weight of cyclic carbonates; and
   ≥0.1% by weight to ≤20% by weight of ethers.

2. The electrolyte according to claim 1, wherein the electrolyte, based on a total weight of the carbonates and ethers, comprises ≥0.5% by weight to ≤2% by weight of ethers.

3. The electrolyte according to claim 1, wherein the electrolyte further comprises at least one conductive lithium salt.

4. The electrolyte according to claim 3, wherein the at least one conductive lithium salt is lithium hexafluorophosphate.

5. The electrolyte according to claim 1, wherein the at least one ether comprises at least one of a monoether and an oligoether.

6. An electrolyte comprising:
   at least one cyclic carbonate and/or at least one acyclic carbonate, and
   at least one ether comprising the formula:

$R_{11}R_{12}R_{13}C-(CR_{14}R_{15})_{x1}-[O-(CR_{31}R_{32})_a-(CR_{33}R_{34})_b]_c-O-(CR_{24}R_{25})_{x2}-CR_{21}R_{22}R_{23}$ or the formula:

$R_{41}R_{42}R_{43}C-(CR_{44}R_{45})_{y1}-O-(CR_{54}R_{55})_{y2}-CR_{51}R_{52}R_{53}$ where:
   $1 \leq c \leq 10$,
   $1 \leq a \leq 5$,
   $0 \leq b \leq 5$,
   $x_1$, $x_2$, $y_1$ and $y_2$ are each independently a number ≥0 and ≤5,
   $R_{11}$ or $R_{41}$ is a carboxylic acid group, carboxylic ester group, hydroxyl group, thiol group, halogen atom, branched, cyclic alkyl group, alkenyl group, alkoxy group, aryl group, heteroaryl group, aryloxy group, or heteroaryloxy group,
   $R_{42}$ and $R_{43}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group,
   $R_{12}$ and $R_{13}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group,
   $R_{21}$, $R_{22}$, $R_{23}$ or $R_{51}$, $R_{52}$, $R_{53}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group,
   $R_{14}$, $R_{15}$, $R_{31}$, $R_{32}$, $R_{33}$, $R_{34}$, $R_{24}$, $R_{25}$, $R_{44}$, $R_{45}$, $R_{54}$ and $R_{55}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group,
   $-CR_{11}R_{12}R_{13}$ or $-CR_{41}R_{42}R_{43}$ is a branched alkyl group, cyclic alkyl group, alkenyl group, aryl group, or heteroaryl group, and
   $-CR_{21}R_{22}R_{23}$ or $-CR_{51}R_{52}R_{53}$ is a branched alkyl group, cyclic alkyl group, alkenyl group, aryl group, or heteroaryl group.

7. An electrolyte solvent or an electrolyte additive for a lithium cell, of the formula:

$R_{11}R_{12}R_{13}C-(CR_{14}R_{15})_{x1}-[O-(CR_{31}R_{32})_a-(CR_{33}R_{34})_b]_c-O-(CR_{24}R_{25})_{x2}-CR_{21}R_{22}R_{23}$ where:
$1 \leq c \leq 10$,
$1 \leq a \leq 5$,
$0 \leq b \leq 5$, $x_1$ and $x_2$ are each independently a number $\geq 0$ and $\leq 5$, $R_{11}$ is a carboxylic acid group, carboxylic ester group, hydroxyl group, thiol group, halogen atom, branched or cyclic alkyl group, alkenyl group, substituted alkenyl group, cyclic alkenyl group, alkoxy group, branched alkoxy group, cyclic alkoxy group, an aryl group, heteroaryl group, aryloxy group, or a heteroaryloxy group, $R_{12}$ and $R_{13}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group, $R_{21}$, $R_{22}$, $R_{23}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group, and $R_{14}$, $R_{15}$, $R_{31}$, $R_{32}$, $R_{33}$, $R_{34}$, $R_{24}$, $R_{25}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group.

8. The electrolyte solvent or electrolyte additive according to claim 7, where:

$R_{31}$, $R_{33}$, $R_{12}$, $R_{14}$, $R_{22}$, and/or $R_{24}$ is an alkyl group, and $R_{32}$, $R_{34}$, $R_{13}$, $R_{15}$, $R_{23}$, and/or $R_{25}$ is hydrogen or an alkyl group.

9. A lithium cell or lithium battery comprising an electrolyte solvent or an electrolyte additive according to claim 7.

10. The electrolyte solvent or electrolyte additive for a lithium cell according to claim 7, wherein:

—$CR_{11}R_{12}R_{13}$ is a branched alkyl group, cyclic alkyl group, alkenyl group, substituted or cyclic alkenyl group, aryl group, or heteroaryl group, —$CR_{11}R_{12}R_{13}$ is —$CH(CH_3)_2$, —$CH_2$–$CH(CH_3)_2$, —$CH(CH_3)(C_2H_5)$, —$C(CH_3)_3$, —$C_6H_{11}$, —$C_6F_{11}$, —$C_6H_5$, or —$C_6F_5$, $R_{21}$ is the same as $R_{11}$, and/or —$CR_{21}R_{22}R_{23}$ is the same as —$CR_{11}R_{12}R_{13}$.

11. An electrolyte solvent or an electrolyte additive for a lithium cell, of the formula:

where:

$1 \leq c \leq 10$, $1 \leq a \leq 5$, $0 \leq b \leq 5$, $x_1$ and $x_2$ are each independently a number $\geq 0$ and $\leq 5$, $R_{11}$ is a carboxylic acid group, carboxylic ester group, hydroxyl group, thiol group, halogen atom, branched or cyclic alkyl group, alkenyl group, substituted alkenyl group, cyclic alkenyl group, alkoxy group, branched alkoxy group, cyclic alkoxy group, an aryl group, heteroaryl group, aryloxy group, or a heteroaryloxy group,

$R_{12}$ and $R_{13}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group, $R_{21}$, $R_{22}$, $R_{23}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group, $R_{14}$, $R_{15}$, $R_{31}$, $R_{32}$, $R_{33}$, $R_{34}$, $R_{24}$, $R_{25}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group, and $R_{11}$ is —$CO_2H$, —$CO_2CH_3$, —$CO_2C_2H_5$, —$SH$, or —$OH$.

12. An electrolyte solvent or electrolyte additive for a lithium cell, of the general chemical formula:

where:

$y_1$ and $y_2$ are each independently a number $\geq 0$ and $\leq 5$,

$R_{41}$ is —$CO_2H$, —$CO_2CH_3$, —$CO_2C_2H_5$, —$SH$, or —$OH$, and $R_{42}$ and $R_{43}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group, or —$CR_{41}R_{42}R_{43}$ is —$C_6H_{11}$, —$C_6F_{11}$, —$C_6H_5$, or —$C_6F_5$, $R_{51}$, $R_{52}$, $R_{53}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group, or —$CR_{51}R_{52}R_{53}$ is a branched alkyl group, a cyclic alkyl group, an alkenyl group, an aryl group, or a heteroaryl group, and $R_{44}$, $R_{45}$, $R_{54}$, and $R_{55}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group.

13. The electrolyte solvent or electrolyte additive as claimed in claim 12, where $R_{41}$ is the same as $R_{51}$ or where —$CR_{41}R_{42}R_{43}$ is the same as —$CR_{51}R_{52}R_{53}$.

14. An electrolyte solvent or electrolyte additive for a lithium cell, of the general chemical formula:

where:

$y_1$ and $y_2$ are each independently a number $\geq 0$ and $\leq 5$, $R_{41}$ is a carboxylic acid group, a carboxylic ester group, a hydroxyl group, a thiol group, a halogen atom, a cyclic alkyl group, an alkenyl group, an alkoxy group, an aryl group, a heteroaryl group, an aryloxy group, a heteroaryloxy group, and $R_{42}$ and $R_{43}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group, or —$CR_{41}R_{42}R_{43}$ is a cyclic alkyl group, an alkenyl group, aryl group, or a heteroaryl group, $R_{51}$, $R_{52}$, $R_{53}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group, or —$CR_{51}R_{52}R_{53}$ is a branched alkyl group, a cyclic alkyl group, an alkenyl group, an aryl group, or a heteroaryl group, and $R_{44}$, $R_{45}$, $R_{54}$, and $R_{55}$ are each independently hydrogen, a carboxylic acid group, a carboxylic ester group, a halogen atom, an alkyl group, an alkenyl group, an alkoxy group, an aryl group, a heteroaryl group, an aryloxy group, or a heteroaryloxy group, and $R_{42}$ and/or $R_{44}$ and/or $R_{52}$ and/or $R_{54}$ are an alkyl group, and where $R_{43}$ and/or $R_{45}$ and/or $R_{53}$ and/or $R_{55}$ are hydrogen or an alkyl group.

* * * * *